United States Patent

[11] 3,629,714

[72] Inventor Ronald Lee Earp
Burlington, N.C.
[21] Appl. No. 18,912
[22] Filed Mar. 12, 1970
[45] Patented Dec. 21, 1971
[73] Assignee Bell Telephone Laboratories Incorporated
Murray Hill, N.J.

[54] ELECTRONIC SAMPLING AND HOLD CIRCUIT
5 Claims, 1 Drawing Fig.

[52] U.S. Cl. .......... 328/151, 328/65, 333/70 R
[51] Int. Cl. .......... H03k 17/74
[50] Field of Search .......... 328/54, 65, 67, 151; 333/70 R

[56] References Cited

UNITED STATES PATENTS

| | | | |
|---|---|---|---|
| 3,412,331 | 11/1968 | Boatwright et al. | 328/151 |
| 2,764,678 | 9/1956 | Craib | 328/67 |
| 2,303,968 | 12/1942 | White | 328/58 |
| 2,461,321 | 2/1949 | Guillemin | 328/65 |
| 3,278,846 | 10/1966 | Patten et al. | 307/267 |
| 2,447,082 | 8/1948 | Miller | 328/58 |

*Primary Examiner*—Donald D. Forrer
*Assistant Examiner*—Harold A. Dixon
*Attorneys*—R. J. Guenther and William L. Keefauver

ABSTRACT: A sample and hold circuit is disclosed in which a gate is enabled to apply a wave sample to the capacitors of a delay line whereupon energy is stored in the capacitors. When the gate is disabled, the stored energy is discharged with the line being effective to produce a relatively flat-topped output over a period of time following the disablement of the gate.

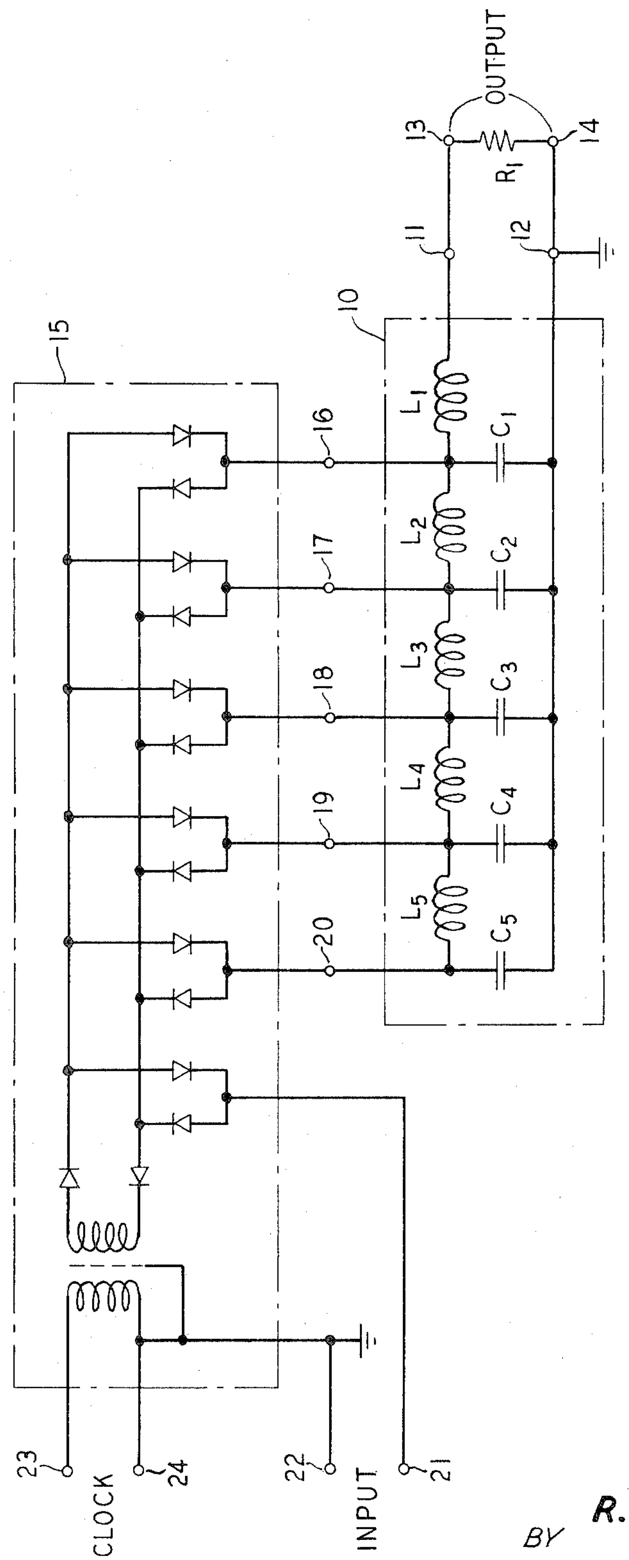
INVENTOR
R.L. EARP
BY
H.L. Logan
ATTORNEY

ELECTRONIC SAMPLING AND HOLD CIRCUIT

GOVERNMENT CONTRACT

The invention herein claimed was made in the course of or under a contract with the Department of the Army.

BACKGROUND OF THE INVENTION

1. Field of the Invention

This invention relates to sample and hold circuits which produce flat-topped outputs.

2. Description of the Prior Art

Circuits for periodically sampling waves are disclosed in the prior art. Such circuits have been used, for example, to sample repetitive waves at slightly later times on successive cycles so that time-stretched versions of the original waves may be constructed for easier spectral analysis.

In many applications, sampling circuits must produce flat-topped outputs; that is, they must have a holding characteristic so that their outputs maintain substantially constant amplitude levels for a period of time following each sampling period. A number of sampling circuits having this characteristic are found in the prior art but unfortunately these sample and hold circuits have frequently been found lacking from dynamic range, linearity, cost and/or reliability standpoints.

SUMMARY OF THE INVENTION

An object of the present invention is to perform a sampling and hold operation by circuitry having improved linearity, dynamic range, reliability and/or economic characteristics.

This and other objects are achieved in accordance with the invention by periodically sampling input waves and applying each sample as it is obtained to each capacitor in a constant-K, constant-Z, low-pass filter type of delay line. When these capacitors discharge between sampling periods, relatively flat-topped output waves are produced. The durations of these waves are directly related to the propagation velocity of the delay line so that the durations of the output waves can be determined by selecting the values of the components of the line.

Each embodiment of the invention includes a one-port ladder network having series connected inductors and shunt connected capacitors with the element closest to the port comprising an inductor and the element most remote from the port comprising a capacitor so that the network has poles at both zero and infinite frequencies. The values of these components are selected so that the network has a constant-K, constant-Z relationship throughout its length. Connected across the network port is a load having an impedance value equal to the input, or driving point, impedance of the network, Finally, a bidirectional current sampling gate is connected to the network to periodically sample input waves and to apply each wave sample as it is obtained to all of the network capacitors in a simultaneous manner. At the end of each sampling period, the sample stored in each capacitor discharges and the remainder of the network cooperates to cause a relatively flat-topped wave to appear across the load connected to the port.

The invention has a number of advantageous features. As illustrated in the disclosed embodiment, for example, embodiments may be formed using passive elements, thereby producing cost and reliability advantages. Furthermore, embodiments may readily be constructed having dynamic ranges in excess of 40 db. and accuracies of one percent or better. Still further, as the duration of the output wave is directly related to the propagation velocity of the network, one may readily design for specific durations.

These and other objects and features of the invention will become apparent from a study of the following detailed description of a specific embodiment.

BRIEF DESCRIPTION OF THE DRAWING

The drawing discloses a schematic diagram of one embodiment of the invention.

DESCRIPTION OF THE DISCLOSED EMBODIMENT

The disclosed embodiment includes a one-port ladder network comprising inductors $L_1$ through $L_5$ and capacitors $C_1$ through $C_5$ having values and being interconnected to form a low-pass composite filter having a constant-K, constant-Z relationship throughout and, further more, interconnected to provide the network with poles at both zero and infinite frequencies.

From filter analysis techniques, network 10 may be viewed as comprising an odd number of substantially identical constant-K, low-pass, L-(or half-) section filters connected in tandem with each filter oriented oppositely to that of its immediate neighbors and with like elements being combined into single elements wherever possible. Similarly, network 10 may be viewed as comprising a plurality of substantially identical constant-K, low-pass, T-section filters connected in tandem with an L-section filter substantially identical to one-half of one of the T-section filters connected as a termination thereto. From still another standpoint, network 10 may be viewed as comprising a plurality of substantially identical constant-K, low-pass, $\pi$-section filters connected in tandem with an L-section filter substantially identical to one-half of one of the $\pi$-section filters connected as the input section to the network. In each of these last two views of the network, similar components are also combines wherever possible.

The input, or driving-point, impedance of network 10 is defined by the expression:

$$Z(s)=L_1s+\cfrac{1}{\cfrac{1}{C_1s}+\cfrac{1}{L_2s+\cfrac{1}{\cfrac{1}{C_2s}+\cfrac{1}{L_3s+\cfrac{1}{\cdots}}}}}$$

where $Z(s)$ is the Laplace transform of the input, or driving-point, impedance, $L_1,L_2,..L_n$ are the values in henries of inductors $L_1,L_2,..L_n$ of the network, $C_1,C_2,..C_n$ are the values in farads of capacitors $C_1,C_2,..C_n$ of the network and $s$ represents a complex number used in Laplace transformations.

This and other characteristics of one-port ladder networks of the present type are discussed in various publications, such as chapter 12 of the text *Network Analysis*, by M. E. Van Valkenburg (Prentice-Hall Inc., 1955).

The disclosed embodiment also includes a load in the form of a resistor $R_1$ having a resistance value substantially equal to the driving-point impedance of network 10 and connected across output terminals 13 and 14. Output terminals 13 and 14 are, in turn, connected to port terminals 11 and 12, respectively.

The disclosed embodiment further includes a bidirectional current sampling gate 15 having output terminals 16 through 20 connected to respective leads of capacitors $C_1$ through $C_5$ of network 10. Sampling gate 15 also includes a pair of input terminals 21 and 22 for receiving waves to be sampled. Terminals 21 and 22 therefore also comprise the input terminals for the disclosed sample and hold embodiment.

Gate 15 also has a pair of terminals 23 and 24 for receiving clock pulses for periodically enabling the gate. When an enabling clock pulse is applied to terminals 23 and 24, all of the diodes in gate 15 are rendered conducting, thereby providing bidirectional current paths between input terminal 21 and capacitors $C_1$ through $C_5$. (A return path is of course provided by the ground connection between terminals 12 and 22.) Because of this bidirectional current characteristic, the gate can sample both positive and negative portions of input waves to produce positive and negative samples, respectively. Furthermore, although a simple, conventional diode bridge circuit is shown in the block for gate 15, the gate, as recognized by those skilled in the art, may take any one of a number of different forms.

In operation, gate 15 is periodically enabled for periods sufficient in duration to permit capacitors $C_1$ through $C_5$ to be charged to approximately the level of the wave being sampled but insufficient in duration to permit a significant storing of energy in any of the other elements of the network. At the termination of each enabling period, capacitors $C_1$ through $C_5$ begin to discharge into resistor $R_1$ and the remaining elements of the network. The discharging energy produces a wave which travels down the network to capacitor $C_5$ where it is inverted and reflected back toward the network port. The result of this action is to produce a substantially flat topped voltage wave at terminals 13 and 14.

The wave produced at terminals 13 and 14 an amplitude approximately equal to one-half that of the voltage across capacitors $C_1$ through $C_5$ when they were initially charged. The duration of this wave, on the other hand, is dependent on the time delay, or propagation velocity, of the network. If the time delay is equal to $t_d$, then the pulse duration is approximately $2t_d$ because the wave initiated in the network must travel down the network to the end where it is reflected back to the port. As well established in the prior art (see, for example, appendix 6 of *Pulse, Digital and Switching Waveforms*, by J. Millman and H. Taub, McGraw-Hill Book Company, 1965), the time delay is related to the products of the values of the inductors and capacitors of the network. Because this is a product relationship while the driving-point impedance is a ratio relationship of these same values, components may be selected for a particular time delay (and therefore output wave duration) without affecting the driving-point impedance of the network. This independence between those two characteristics facilitates component selections for embodiments of the invention.

What is claimed is:

1. A sample and hold circuit comprising
a set of input terminals,
a set of output terminals,
a one-port ladder network comprising capacitors and inductors interconnected to form a low-pass composite filter having a constant-K and constant-Z relationship throughout and, furthermore, to provide said network with poles at both zero and infinite frequencies,
a load having an impedance value substantially equal to the driving-point impedance of said network and connected across said output terminals,
means connecting said network port to said output terminals, and
a bidirectional current sampling gate connected between said input terminals and said capacitors of said network to apply to said capacitors samples of waves applied to said input terminals.

2. A sample and hold circuit comprising
a set of input terminals,
a set of output terminals,
a one-port ladder network comprising an odd number of substantially identical constant-K, low-pass L-section filters connected in tandem with each of said filters oriented oppositely to that of its immediate neighbors so as to provide said network with poles at both zero and infinite frequencies,
a load having an impedance value substantially equal to the driving-point impedance of said network and connected across said output terminals,
means connecting said network port to said output terminals, and
a bidirectional current sampling gate connected between said input terminals and said capacitors of said network to apply to said capacitors samples of waves applied to said input terminals.

3. A sample and hold circuit comprising
a set of input terminals,
a set of output terminals,
a one-port ladder network comprising capacitors and inductors interconnected to form a plurality of substantially identical constant-k, low-pass, T-section filters connected in tandem with an L-section filter substantially identical to one-half of one of said T-section filters connected as a termination thereto.
a load having an impedance value substantially equal to the driving-point impedance of said network and connected across said output terminals,
means connecting the port of said network to said output terminals, and
a bidirectional current sampling gate connected between said input terminals and said capacitors of said network to apply to said capacitors samples of waves applied to said input terminals.

4. A sample and hold circuit comprising
a set of input terminals,
a set of output terminals,
a one-port ladder network comprising capacitors and inductors interconnected to form a plurality of substantially identical constant-K, low-pass, $\pi$-section filters connected in tandem with an L-section filter substantially identical to one-half of one of said $\pi$-section filters connected as the input section to said network,
a load having an impedance value substantially equal to the driving-point impedance of said network and connected across said output terminals,
means connecting the port of said network to said output terminals, and
a bidirectional current sampling gate connected between said input terminals and said capacitors of said network to apply to said capacitors samples of waves applied to said input terminals.

5. A sample and hold circuit comprising
a set of input terminals,
a set of output terminals,
a one-port ladder network comprising $n$ capacitors and $n$ inductors interconnected to form a low-pass composite filter having a constant-K and constant-Z relationship throughout and a driving-point impedance defined by the expression:

$$Z(s)=L_1s+\cfrac{1}{\cfrac{1}{C_1s}+\cfrac{1}{L_2s+\cfrac{1}{\cfrac{1}{C_2s}+\cfrac{1}{L_3s+\cfrac{1}{\cdots}}}}}$$

where $Z(s)$ is the Laplace transform of the input, or driving-point, impedance,
$L_1, L_2,..L_n$ are the values in henries of inductors $L_1, L_2,..L_n$ of the network, $C_1, C_2,..C_n$ are the values in farads of capacitors $C_1, C_2,..C_n$ of the network and $s$ represents a complex number used in Laplace transformations,
a load having an impedance value substantially equal to said driving-point impedance and connected across said output terminals,
means connecting the port of said network to said output terminals, and
a bidirectional current sampling gate connected between said input terminals and said capacitors of said network to apply to said capacitors samples of waves applied to said said input terminals.

* * * * *